(12) United States Patent
Kato et al.

(10) Patent No.: US 7,952,241 B2
(45) Date of Patent: May 31, 2011

(54) COOLING FAN BUILT INTO ROTOR

(75) Inventors: Masahiko Kato, Matsudo (JP); Yusuke Miyajima, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 233 days.

(21) Appl. No.: 12/325,355

(22) Filed: Dec. 1, 2008

(65) Prior Publication Data
US 2009/0167120 A1 Jul. 2, 2009

(30) Foreign Application Priority Data

Dec. 28, 2007 (JP) ................................. 2007-339741

(51) Int. Cl.
*H02K 9/06* (2006.01)
(52) U.S. Cl. ...................... 310/63; 310/60 R; 417/423.7
(58) Field of Classification Search ................ 310/60 A, 310/60 R, 62–63, 411, 417; 417/423.7
See application file for complete search history.

(56) References Cited

U.S. PATENT DOCUMENTS

| | | | | |
|---|---|---|---|---|
| 5,053,657 A | * | 10/1991 | Ikegami et al. | 310/63 |
| 5,714,810 A | * | 2/1998 | Yuhi et al. | 310/40 MM |
| 6,977,452 B2 | * | 12/2005 | Ibach | 310/62 |
| 7,323,797 B2 | * | 1/2008 | Furui et al. | 310/58 |
| 2009/0273246 A1 | * | 11/2009 | Weiss | 310/61 |
| 2010/0090561 A1 | * | 4/2010 | Leroy et al. | 310/216.114 |

FOREIGN PATENT DOCUMENTS

| | | | |
|---|---|---|---|
| EP | 0 244 134 | | 11/1987 |
| GB | 2275829 A | * | 3/1995 |
| GB | 2385715 A | * | 2/2002 |
| JP | 2694949 | | 12/1997 |
| JP | 2000-312455 A | * | 11/2000 |
| JP | 2002-101614 A | * | 4/2002 |
| JP | 3469751 | | 11/2003 |

OTHER PUBLICATIONS

Hashimoto, Koichi JP 2002-101614 A Apr. 2002 Machine Translation from JPO IPDL.*
Natsuhara, Tsutomu et al. JP 2000-312455 A Nov. 2000 Machine Translation from JPO IPDL.*

* cited by examiner

*Primary Examiner* — Burton Mullins
(74) *Attorney, Agent, or Firm* — McGlew and Tuttle, P.C.

(57) ABSTRACT

A cooling fan includes a fan ring to be attached to an end surface of a rotor core near the outer circumference thereof, and a plurality of fins connected to the fan ring. The fan ring has positioning leg portions provided on an end surface thereof facing a thrust direction. The fan ring is positioned in relation to the rotor core through insertion of the positioning leg portions into core slots of the rotor core. The fan ring has wire accommodation recesses which are formed on the end surface of the fan ring facing the thrust direction and communicate with the core slots.

4 Claims, 9 Drawing Sheets

COOLING FAN BUILT INTO ROTOR

BACKGROUND OF THE INVENTION

1. Field of the Invention

The present invention relates to a rotor-attachment cooling fan which is attached to the rotor of a motor for self cooling.

2. Description of the Related Art

Small-sized motors used for electric power tools must satisfy various requirements such as high output, large torque, compactness, light weight, low power consumption, and high cooling performance (for preventing temperature increase of a motor itself). In order to satisfy these requirements in a well-balanced manner, a thicker wire of an increased length must be wound around a rotor having a limited size. However, in a motor which generates a high output and a large torque, large current flows through windings of the rotor, and heat is generated, whereby electrical, mechanical, and magnetic malfunctions occur. In order to prevent these malfunctions, a cooling fan is attached to the rotor for self cooling. Further, it is known that, in the case where such a cooling fan is attached to the rotor by means of bonding the cooling fan to an end surface of the rotor core rather than the commutator that generates heat, it becomes unnecessary to use a material having high heat resistance for the cooling fan, whereby the cooling fan can be manufactured at low cost (see Japanese Patent No. 3469751 and Japanese Patent No. 2694949).

Figure 10A:
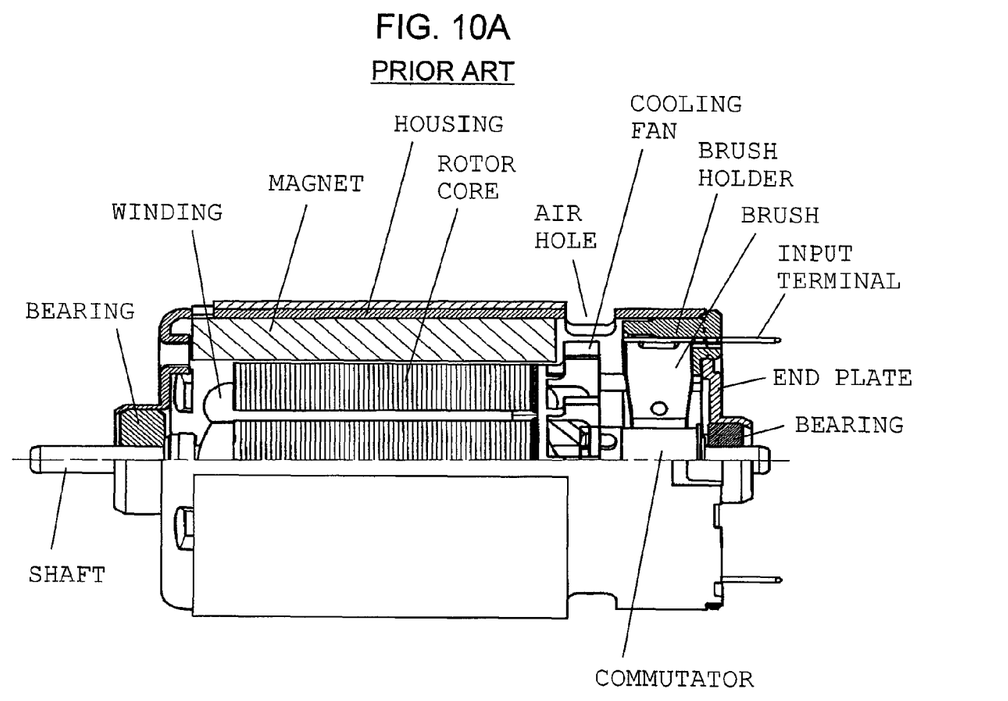
FIG. 10A is a longitudinal cross sectional view of a small-sized motor as shown in Japanese Patent No. 3469751, into which a conventional cooling fan is incorporated.
Figure 10B:
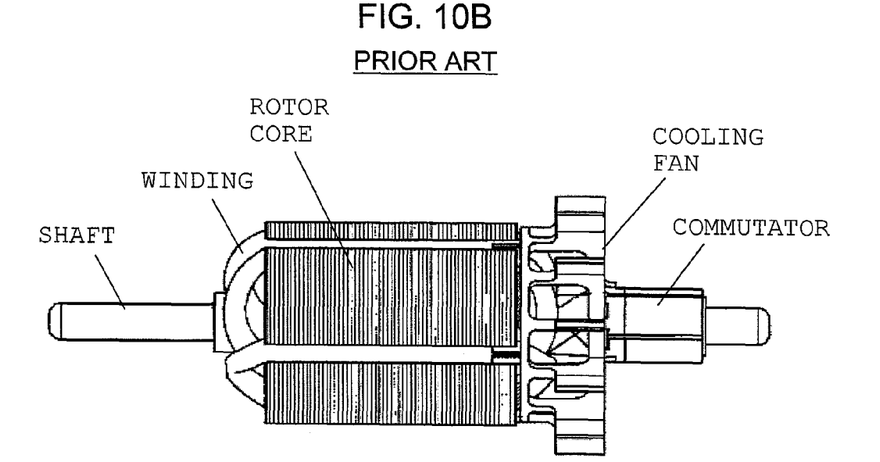
FIG. 10B is a front view of the rotor.

FIG. 10A is a longitudinal cross sectional view of a small-sized motor as shown in Japanese Patent No. 3469751, into which a conventional cooling fan is incorporated. FIG. 10B is a front view of the rotor. In the illustrated small-sized motor, a motor casing is composed of a housing which is made of a metallic material such as soft iron and is formed into the shape of a bottomed hollow tube; and an end plate fitted into an opening of the housing. Magnets are fixed to an inner circumferential surface of the housing; and a rotor is rotatably supported by two bearings fixed to the center of a bottom portion of the housing and a central portion of the end plate, respectively, such that the rotor faces the magnets. The rotor is composed of a rotor core around which a plurality of windings are formed; a commutator; a cooling fan; a shaft connected to external equipment; etc. Brushes formed of an electrically conductive material are attached to the end plate via a brush holder, along with input terminals electrically connected to the brushes, such that the brushes are in sliding engagement with the commutator. Air holes are provided in the housing and the end plate at proper positions. The cooling fan is positioned on and fixed to an end surface of the rotor core. When the rotor having the above-described configuration rotates, the cooling fan fixed to the rotor takes in air via the air holes formed in the end plate and the bottom wall of the housing, so that the air cools the commutator, the brushes, the wirings, and the rotor core. Subsequently, the air is forced to flow radially outward from the fins of the cooling fan, to thereby be discharged via the air holes provided in the circumferential wall of the housing.

Figure 11A:
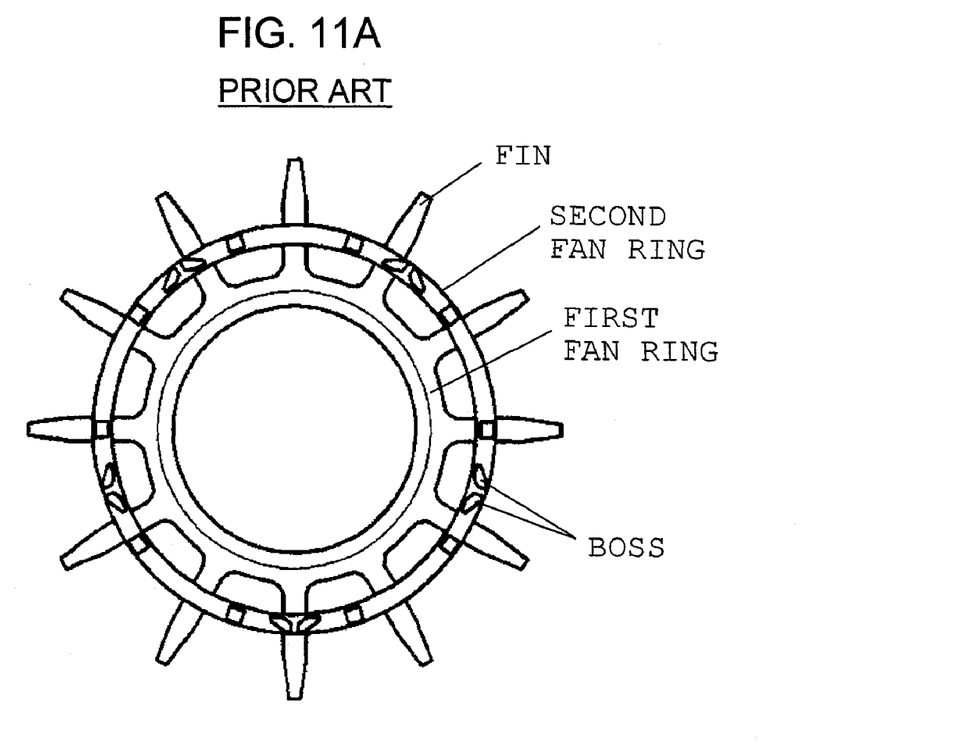
FIG. 11A is a view of the conventional cooling fan attached to the rotor, as viewed from the side on which the fan is fixed to the end surface of the rotor core.
Figure 11B:
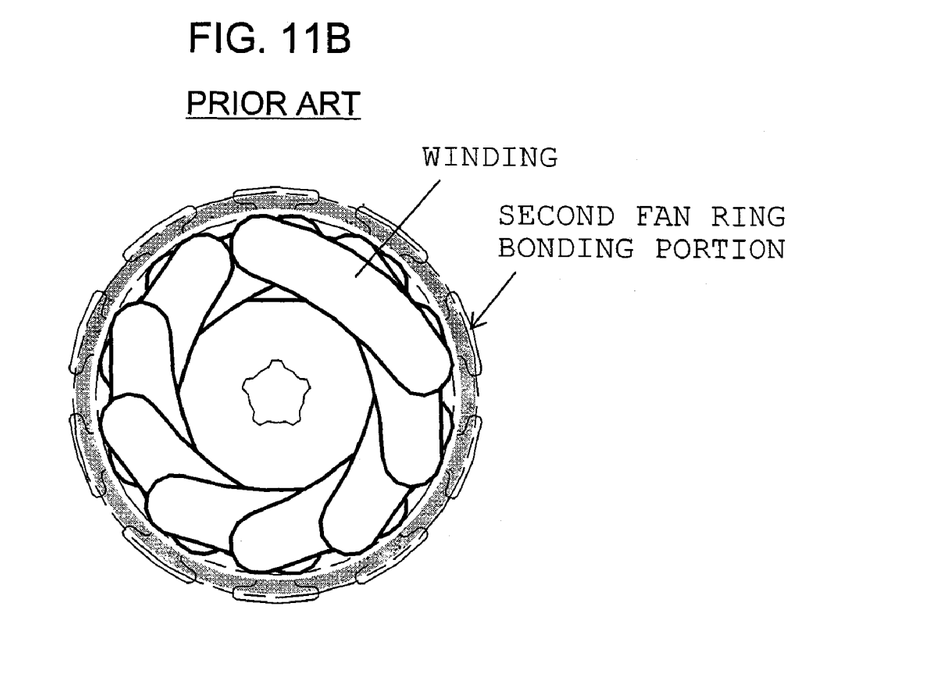
FIG. 11B is an explanatory view showing bonding and fixing the cooling fan to the end surface of the rotor core.

FIG. 11A is a view of the conventional cooling fan attached to the rotor, as viewed from the side on which the fan is fixed to the end surface of the rotor core. FIG. 11B is an explanatory view showing bonding and fixing the cooling fan to the end surface of the rotor core. The illustrated fan is composed of a first fan ring, a second fan ring, a plurality of fins provided at constant circumferential intervals between these rings, and a plurality of bosses provided on an end surface of the second fan ring. The plurality of fins define openings serving as air passages between the first and second rings. The second ring is positioned by means of inserting the bosses provided thereon into core slots of the rotor core. The fixation between the fan and the rotor is effected through bonding the second fan ring to the outermost circumferential portion of the end surface of the rotor core.

As shown in FIG. 11B, the second fan ring is bonded in such a manner that the end surface of the second fan ring abuts the outermost circumferential portion of the end surface of the rotor core. Therefore, the windings are restricted to the radially inner side of the second fan ring. Since the conventional cooling fan restricts the range in which winding can be performed (hereinafter referred to as the "windable range") as described above, the conventional fan has a problem of limiting the performance of the motor. In the case where an increased amount of wire is wound around the rotor in order to enhance the motor performance, the resultant winding expands to a cooling fan attachment portion at the outer circumferential edge of the end surface of the rotor core. In such a case, if an attempt is made to attach the cooling fan to the end surface of the rotor core, the second fan ring of the cooling fan comes into contact with the expanded winding, so that attachment of the cooling fan to an intended position becomes impossible.

Interference (contact) of the cooling fan with the windings of the rotor causes a decrease in fan bonding strength and fixation of the fan to an improper position, which results in deterioration of rotor cooling performance, deterioration of mechanical balance of the rotor, and an increase in mechanical noise of the motor. The motor performance can be increased by winding a larger amount of thick wire. However, since the conventional cooling fan restricts the windable range, the motor performance is limited.

Similarly, in the case of the motor disclosed in Japanese Patent No. 2694949 as well, if a large amount of wire is wound around the rotor in order to improve the motor performance, an annular plate of a cooling fan comes into contact with the expanded windings, so that the cooling fan cannot be attached to an intended position. In order to allow attachment of the cooling fan, winding of the wire must be stopped before reaching the limit, so that the motor performance cannot be improved.

SUMMARY OF THE INVENTION

An object of the present invention is to solve the above-mentioned problems and to prevent interference between windings of a rotor and a cooling fan even when a large amount of wire is wound around the rotor so as to improve the performance of the motor, and enables attachment of the cooling fan to an intended portion. Further, the present invention enables the wire to be wound to the limit, to thereby improve the performance of the motor.

A rotor-attachment cooling fan of the present invention is attached to a rotor which includes a shaft, a rotor core attached to the shaft and including a plurality of windings provided thereon, and a commutator attached to the shaft. The cooling fan includes a fan ring to be attached to an end surface of the rotor core near the outer circumference thereof, and a plurality of fins connected to the fan ring. The fan ring has positioning leg portions provided on an end surface thereof facing a thrust direction. The fan ring is positioned in relation to the rotor core through insertion of the positioning leg portions into core slots of the rotor core. The fan ring has wire accommodation recesses which are formed on the end surface facing the thrust direction and communicate with the core slots.

The wire accommodation recesses are formed adjacent to the positioning leg portions, and pocket-forming projections are provided on the end surface of the fan ring facing the thrust direction. The cooling fan is integrally formed such that the plurality of fins are connected between the fan ring and another fan ring axially separated from the former fan ring. The wire accommodation recesses are formed such that at least portions of the wire accommodation recesses face the corresponding core slots so as to receive corresponding portions of the wire expanded to the outer circumferential edge of the core rotor. The depth of the wire accommodation recesses as measured along the thrust direction is equal to or greater than the diameter of each of the wound wires. The circumferential positions of the wire accommodation recesses correspond to the respective outermost portions of the plurality of windings.

According to the present invention, even when a larger amount of wire is wound around the rotor in order to improve the performance of the motor, the expanded windings and the cooling fan do not interfere with each other, so that the cooling fan can be attached to an intended position. Even when the wire is wound to a region where the fan ring is conventionally disposed, the cooling fan does not interfere with the resultant windings. Since the windable range increases, the performance of the motor can be improved.

BRIEF DESCRIPTION OF THE DRAWINGS

FIGS. 3A and 3B are explanatory views showing the arrangement of the fan on the end surface of the rotor core around which wires have been wound, wherein

DETAILED DESCRIPTION OF THE PREFERRED EMBODIMENTS

Figure 1A:
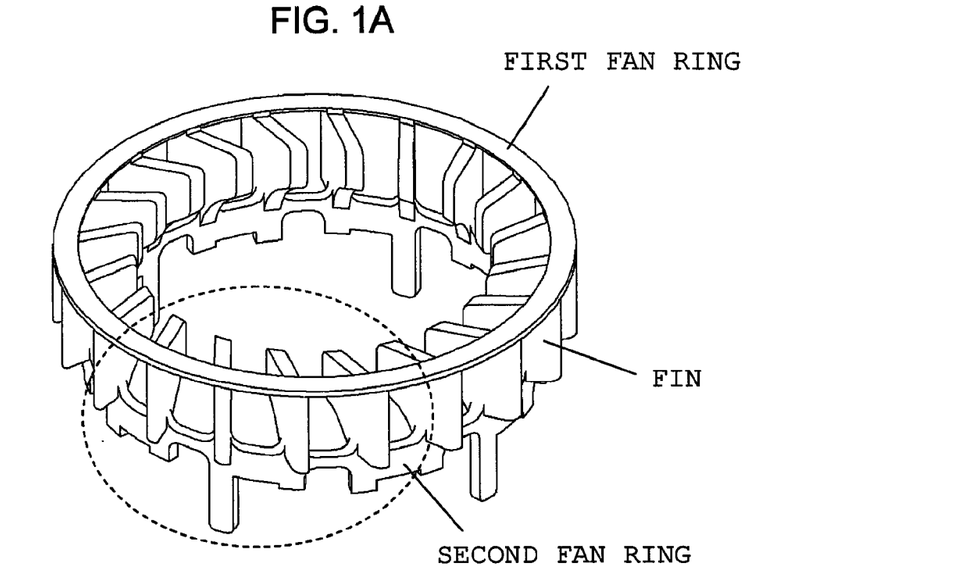
FIG. 1A is a perspective view showing a first example cooling fan configured in accordance with the present invention.
Figure 1B:
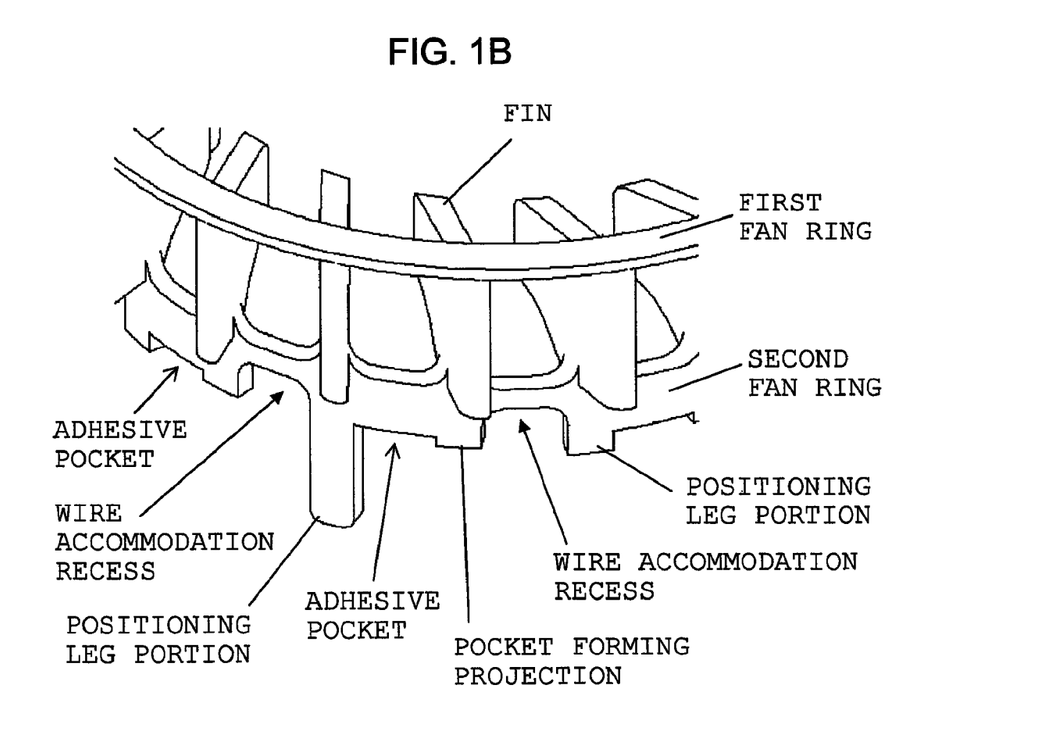
FIG. 1B is an enlarged view of a portion of FIG. 1A within a broken-line circle.

The present invention will now be described by way of examples. FIG. 1A is a perspective view showing a first example cooling fan configured in accordance with the present invention, and FIG. 1B is an enlarged view of a portion of FIG. 1A within a broken-line circle. The cooling fan is integrally formed of, for example, a synthetic resin such that a plurality of fins are disposed between and connected to first and second fan rings separated from each other along an axial direction. When the cooling fan is attached to the rotor, the first fan ring is located radially outward of an end portion of a commutator, so that a clearance is provided between the first fan ring and an outer circumferential surface of the commutator so as to allow air to flow through the clearance. The second fan ring has an end surface facing a thrust direction (parallel to the axial direction of a motor shaft), and the end surface is bonded to an end surface of a rotor core near the outer circumference thereof by use of an adhesive, in a manner similar to that described with reference to FIG. 10B. At that time, positioning leg portions provided on the end surface of the second fan ring and extending in the thrust direction are inserted into core slots, whereby the positioning leg portions are positioned in relation to the rotor core, and serve as rotation prevention means.

The illustrated cooling fan is assumed to be attached to the rotor of a motor having 4 stator magnet poles and 10 rotor poles. Ten positioning leg portions in total are inserted into ten core slots such that one positioning leg portion is inserted into each core slot. In the case where all the ten positioning leg portions are elongated in the thrust direction, they advantageously act as rotation prevention means. However, all the positioning leg portions may be shortened, or, as shown in the drawings, only some (four) of the positioning leg portions may be elongated. In such a case, the positioning leg portions can achieve the rotation prevention function. Further, irrespective of their lengths, the positioning leg portions are not necessarily required to be inserted into all the core slots. The number of positioning leg portions to be inserted into the core slots can be arbitrarily set in accordance with a load which acts on the fan and which changes depending on the rotational speed of the motor and the size of the fins. Desirably, three or more positioning leg portions are inserted into the core slots, in consideration of the purpose of positioning at the time of attachment of the fan. In the illustrated cooling fan, a wire accommodation recess, which has a U-like shape, for example, is formed adjacent to each of the positioning leg portions. Further, a pocket-forming projection is provided between adjacent positioning leg portions, whereby an adhesive pocket is formed between each pocket-forming projection and the corresponding positioning leg portion. In the illustrated example, the number of the wire accommodation recesses is 10, the number of the adhesive pockets is 10, and the number of the fins is 20.

A rotor to which the cooling fan of the present invention is attached, and a motor to which the rotor is attached may have respective ordinary structures as described with reference to FIGS. 10A and 10B. The cooling fan of the present invention can be used as a replacement for the cooling fan attached to the rotor as illustrated in FIG. 10B. That is, the cooling fan of the present invention is attached to a rotor which is composed of a rotor core having a plurality of windings wound thereon, a commutator, and a shaft connected to external equipment. As shown in FIG. 10A, such a rotor is rotatably supported within a housing, whereby a motor is configured. Stator pole magnets are fixed to a motor casing composed of the housing and an end plate attached to an opening of the housing, and a pair of brushes in sliding contact with the commutator are provided. Further, air holes are provided in the housing and the end plate at proper positions. When the rotor rotates, the cooling fan fixed to the rotor takes in air via an air hole of the housing, so that the air cools the commutator, the brushes, the wirings, and the rotor core. Subsequently, the air is discharged via another air hole of the housing.

Figure 2:
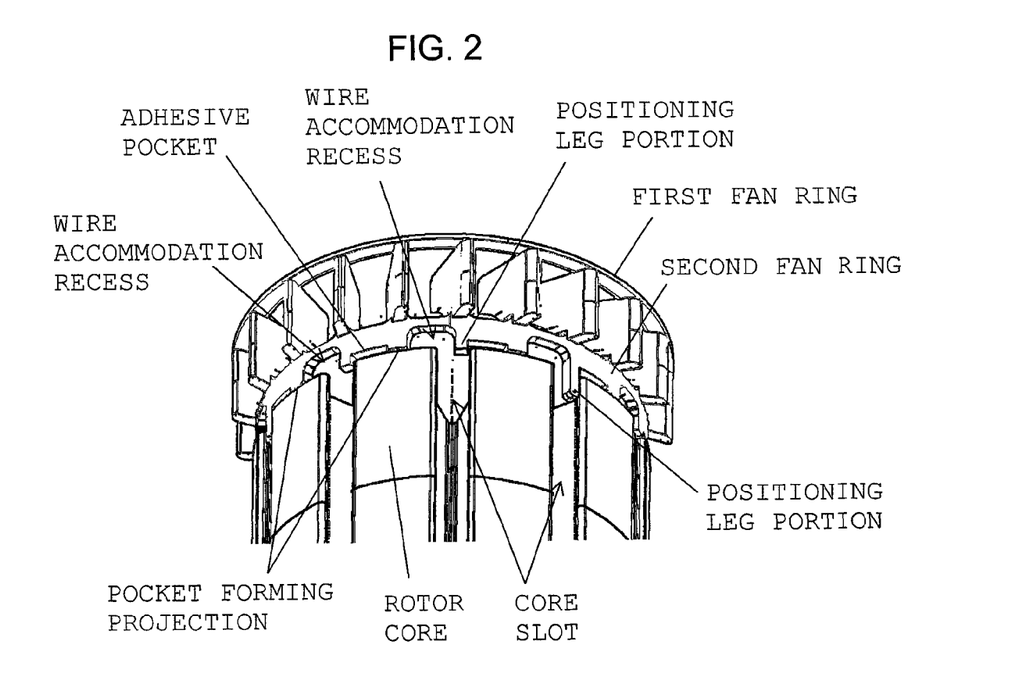
FIG. 2 is an explanatory view showing the arrangement of the fan on an end surface of a rotor core.

FIG. 2 is an explanatory view showing the arrangement of the fan on an end surface of the rotor core. In order to make the drawing clear, the windings are omitted. When the end surface of the second fan ring facing the thrust direction is disposed on the outermost circumferential portion of the end surface of the rotor core, the pocket-forming projections integral with the second fan ring abut the end surface of the rotor core to thereby position the cooling fan along the thrust direction (the axial direction of the shaft). During this operation, the positioning leg portions are inserted into the core slots of the rotor core, and are brought into contact with corresponding wall surfaces of the rotor core, whereby positioning of the cooling fan in relation to the rotor core in the thrust and radial directions is completed.

Figure 3A:
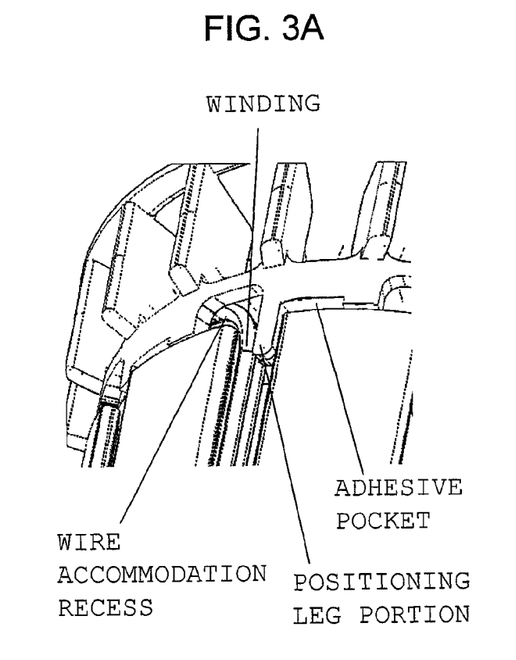
FIG. 3A is a view of a wire accommodation recess and its vicinity as viewed from the outer side of the fan.
Figure 3B:
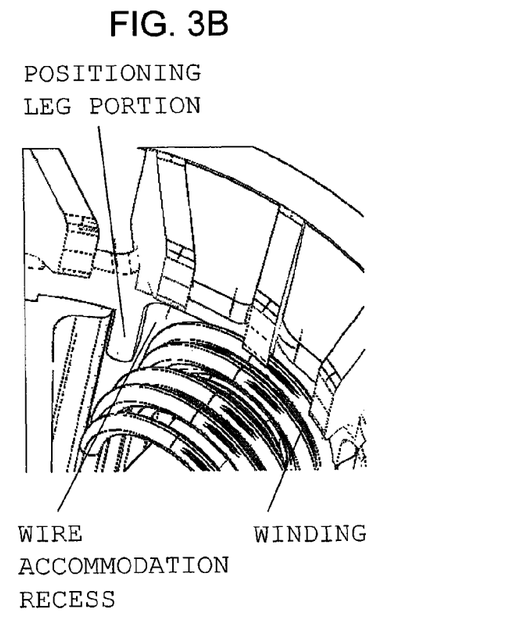
FIG. 3B is a view of the wire accommodation recess and its vicinity as viewed from the inner side of the fan.

FIGS. 3A and 3B are explanatory views showing the arrangement of the fan on the end surface of the rotor core around which wires have been wound, wherein FIG. 3A is a view of a wire accommodation recess and its vicinity as viewed from the outer side of the fan, and FIG. 3B is a view of the wire accommodation recess and its vicinity as viewed from the inner side of the fan. As shown in these drawings, the wire accommodation recesses can accommodate the windings which have expanded to the cooling fan attachment portion at the outer circumferential edge of the end surface of the rotor core because of a larger amount of a wire being wound around the rotor so as to improve the performance of the motor.

Figure 4:
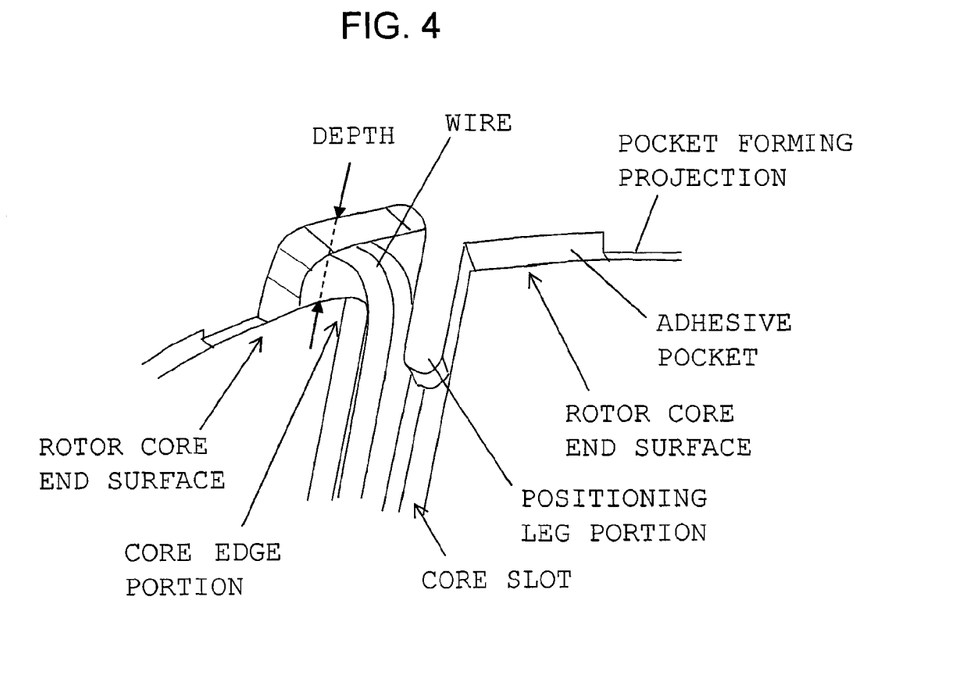
FIG. 4 is a view showing the details of the wire accommodation recess and its vicinity shown in FIG. 3A.

FIG. 4 is a view showing the details of the wire accommodation recess and its vicinity shown in FIG. 3A. An adhesive is applied to the outermost circumferential portion of the end surface of the rotor core, and the cooling fan is attached thereto while being positioned, whereby the cooling fan is fixed to the end surface of the rotor core. During this operation, the adhesive is supplied at least into the adhesive pockets, and a portion of the adhesive may leak to the wire accommodation recesses and the core slots. Desirably, in order to hold the adhesive within the adhesive pockets to thereby prevent leakage of a large amount of the adhesive, the adhesive pockets are disposed such that they do not have an opening in communication with the core slots. In other words, the adhesive pockets are provided such that they are closed by the end surface of the rotor core.

Each wire accommodation recess faces the corresponding core slot such that it crosses over a core edge portion on one side of the core slot or core edge portions on opposite sides of the core slot, in order to accommodate the windings expanded to the outer circumferential edge of the core. In other words, the wire accommodation recesses communicate with the core slots. The depth (a dimension as measured along the thrust direction) of the wire accommodation recesses must be at least the diameter of the wound wire. In actuality, desirably, the depth is equal to or greater than two times the diameter of the wire, in consideration of the case where the wire obliquely passes through the wire accommodation recess as shown in FIG. 4, and in consideration of variation of the diameter of the wire.

Figure 5:
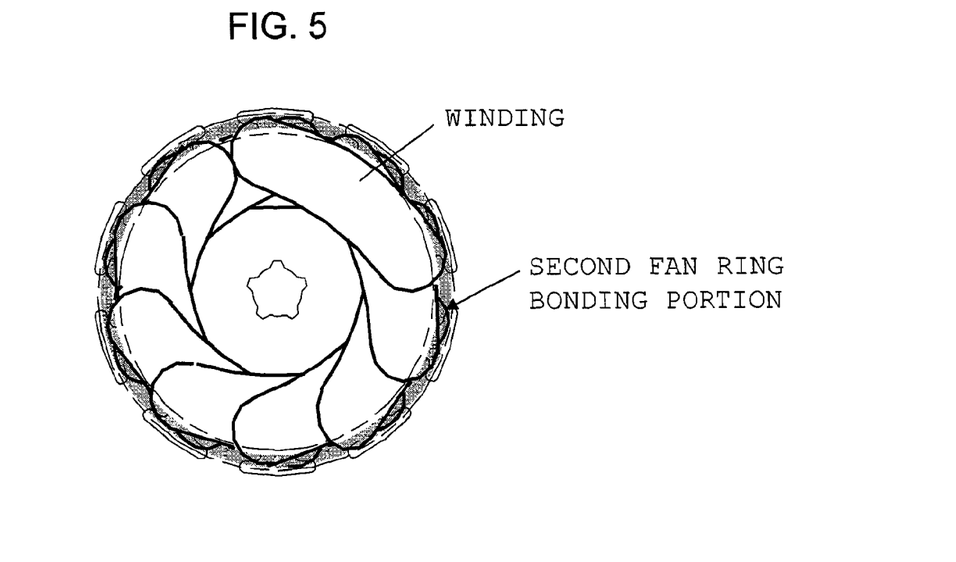
FIG. 5 is a view of the end surface of the core rotor with windings formed thereon, as viewed from the side where the fan is bonded and fixed.

FIG. 5 is a view of the end surface of the core rotor with windings formed thereon, as viewed from the side where the fan is bonded and fixed thereto. The fan is bonded and fixed to a second-fan-ring bonding portion of the end surface of the rotor core located at the circumferential edge of the core. However, the cooling fan itself is not shown in FIG. 5. As becomes apparent through comparison with FIG. 11B showing the conventional cooling fan, in FIG. 5, the windings are not restricted to the inner side of the second fan ring, and expanded portions of the windings enter the spaces between the second fan ring and the end surface of the rotor core. Through practicing the present invention, the cooling fan can be attached even in the case where the wire is wound to the limit, whereby the performance of the motor can be improved.

Figure 6A:
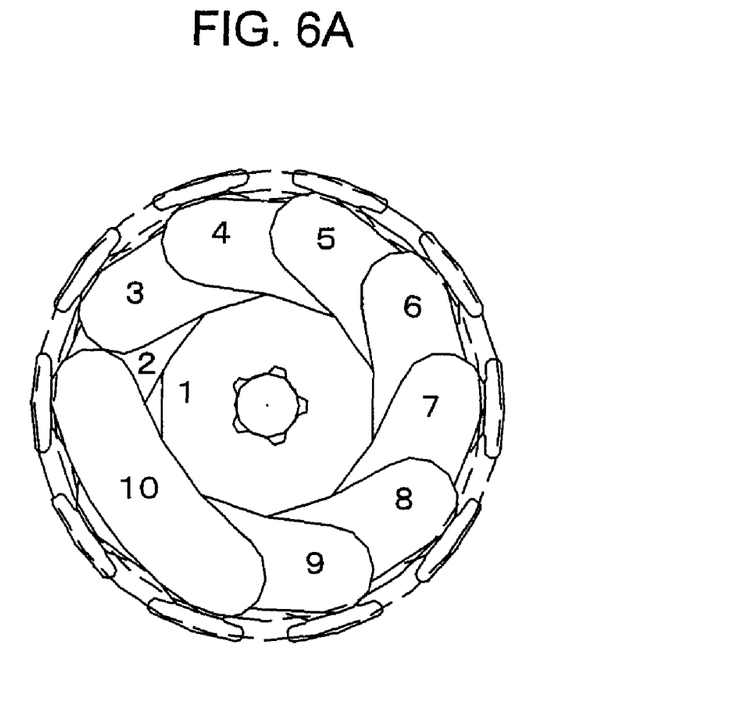
FIGS. 6A and 6B are views showing a first example winding method generally employed.
Figure 6B:
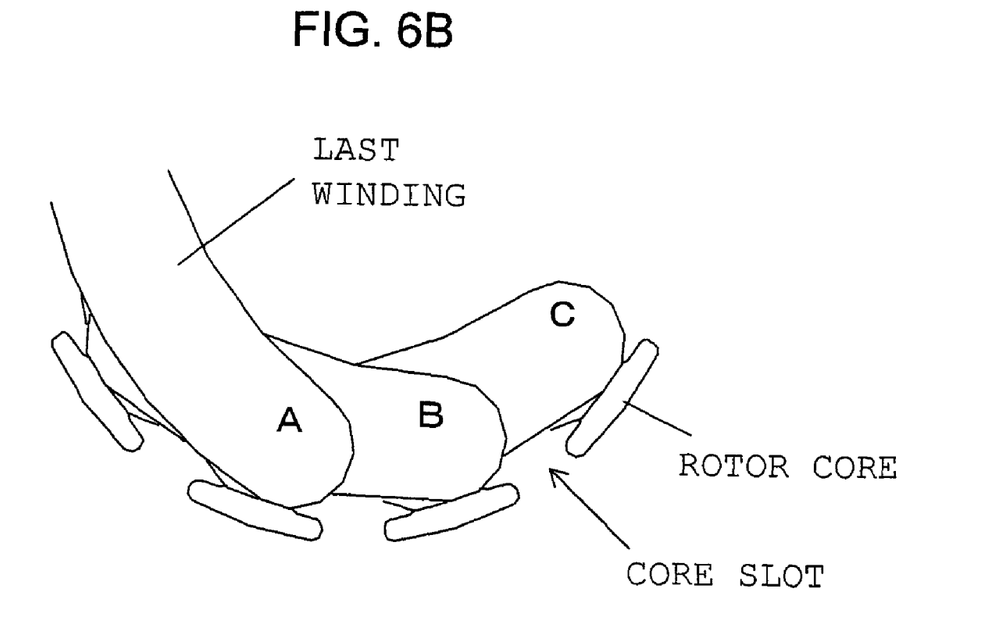

FIGS. 6A and 6B are views showing a first example winding method generally employed. As shown in FIG. 6A, there is known a method of winding wires around 10 core poles in such a manner that each winding is formed around three poles, and 10 windings in total are successively formed in one direction (clockwise direction) as shown in FIG. 6A. When such winding is performed, the previously formed winding is pressed inside upon formation of the next winding. Therefore, as shown in FIG. 6B, outermost portions A, B, C, etc. of the windings appear on the left sides of the core slots at constant circumferential intervals. For such a winding method, the wire accommodation recesses are desirably provided in the second fan ring at constant circumferential intervals such that they are provided on the left sides of the core slots, as shown in FIG. 2.

Figure 7A:
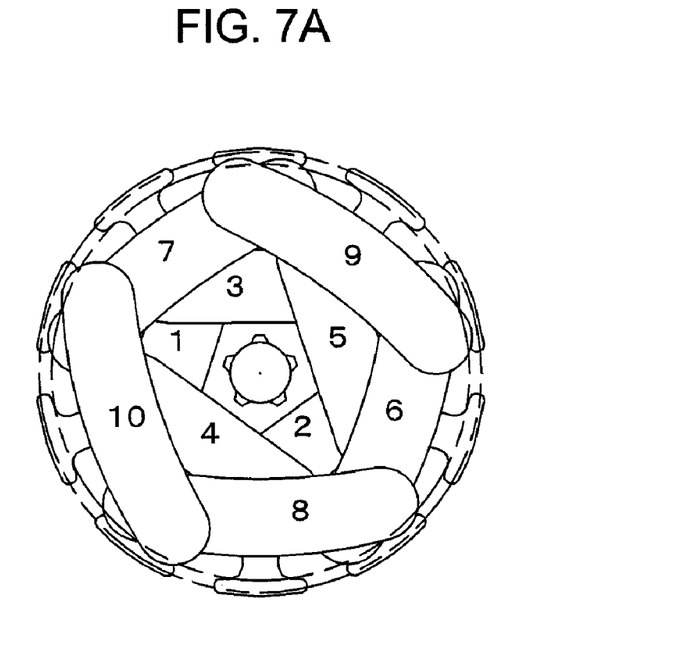
FIGS. 7A and 7B are views showing a second example winding method generally employed.
Figure 7B:
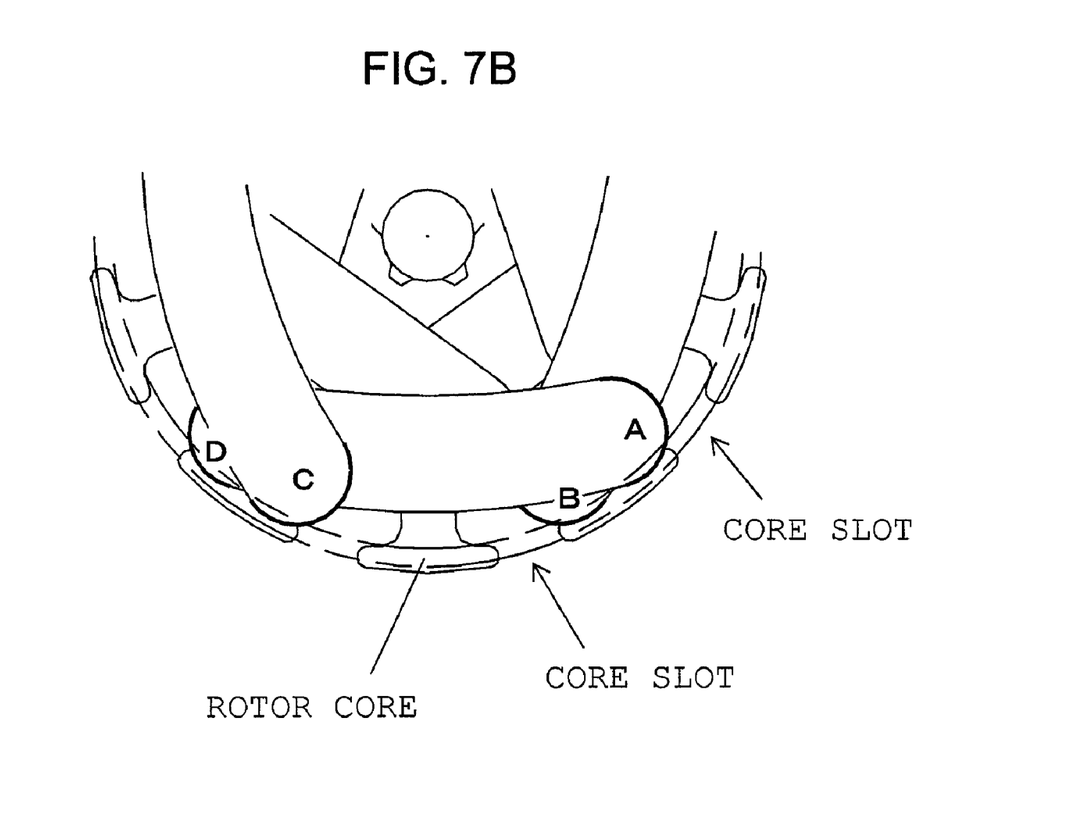

FIGS. 7A and 7B are views showing a second example winding method generally employed. As shown in FIG. 7A, there is known a method of winding wires around 10 core poles in such a manner that, in relation to a previously formed winding, a subsequent winding is formed on the diametrically opposite side, and the center of the subsequent winding in the circumferential direction is located at a pole adjacent to a pole opposite the center of the previously formed winding. Numerals assigned to the windings show the winding sequence. When such a winding method is employed, as shown in FIG. 7B, outermost portions of the windings alternately appear on the left sides and right sides of the core slots. That is, whereas the outermost portions A and C are located on the left sides of the corresponding core slots, and the outermost portions B and D are located on the right sides of the corresponding core slots. Therefore, although the outermost portions A and B are close to each other and the outermost portions C and D are close to each other, a relative large clearance exists between the outermost portions B and C. For such a winding method, the wire accommodation recesses are desirably provided such that they are alternately located on the right and left sides of the core slots, and the wire accommodation recesses form pairs of two accommodation recesses located close to each other in the circumferential direction of the second fan ring.

Figure 8A:
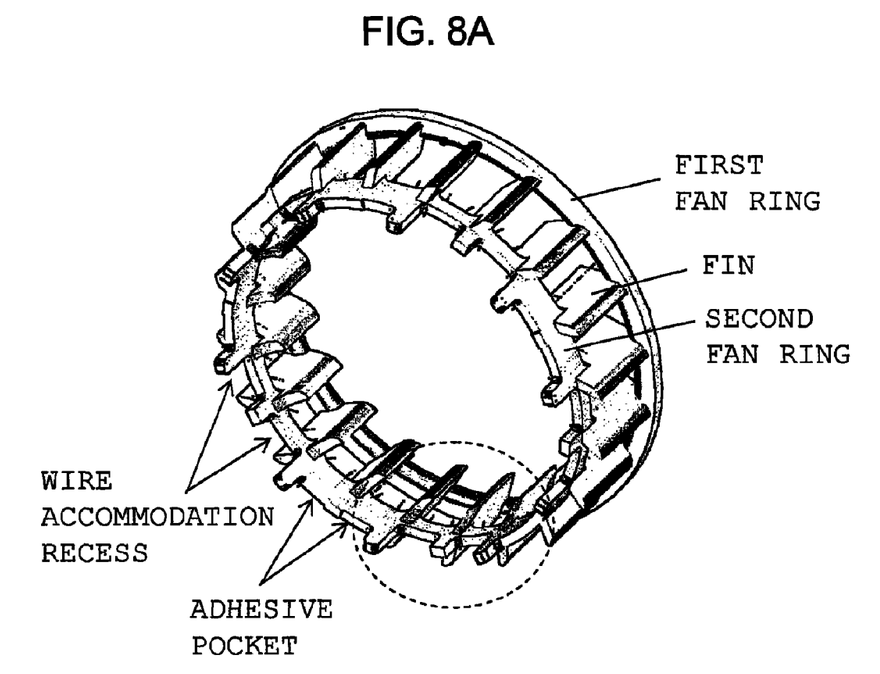
FIG. 8A is a perspective view showing a second example cooling fan configured in accordance with the present invention.
Figure 8B:
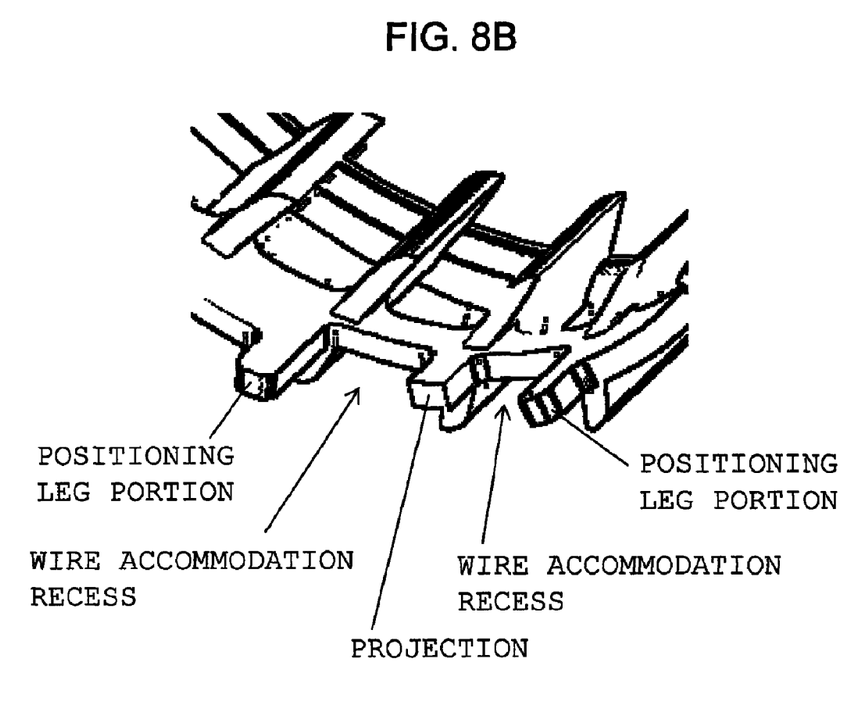
FIG. 8B is an enlarged view of a portion of FIG. 8A within a broken-line circle.

FIG. 8A is a perspective view showing a second example cooling fan configured in accordance with the present invention, and FIG. 8B is an enlarged view of a portion of FIG. 8A within a broken-line circle. The cooling fan shown in FIGS. 8A and 8B is suitable for the winding method shown in FIGS. 7A and 7B. As shown in FIG. 8A, pairs each including two adjacent adhesive pockets and pairs each including two adjacent wire accommodation recesses are alternately formed. As shown in FIG. 8B, projections which abut the outer circumferential edge of the end surface of the rotor core are provided, and the wire accommodation recesses are formed on opposite sides of each projection. Further, positioning leg portions are provided on opposite sides of the wire accommodation recesses.

Figure 9A:
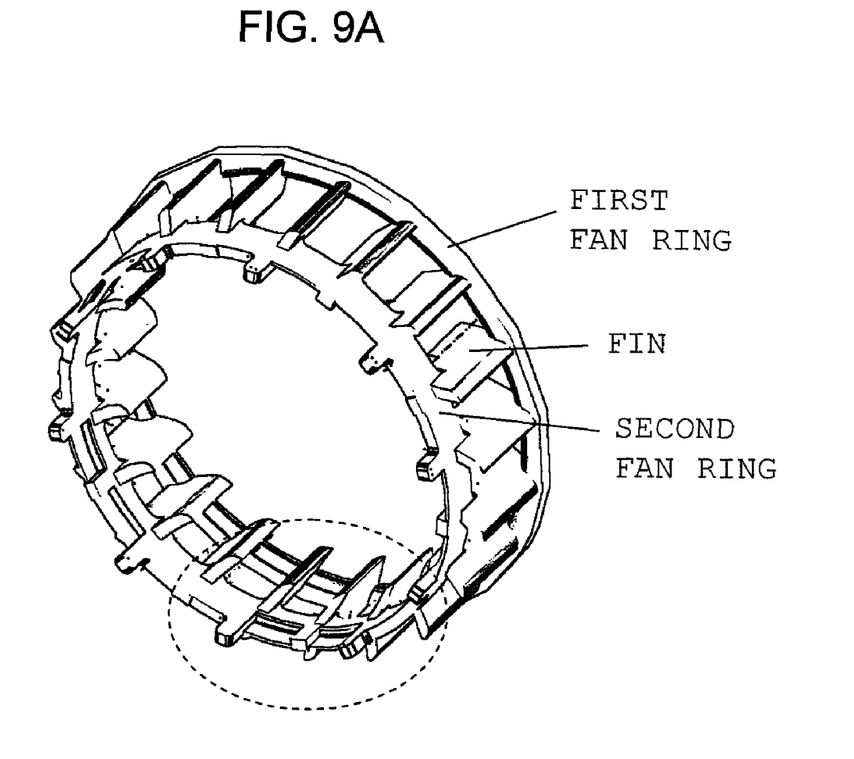
FIG. 9A is a perspective view showing a third example cooling fan configured in accordance with the present invention.
Figure 9B:
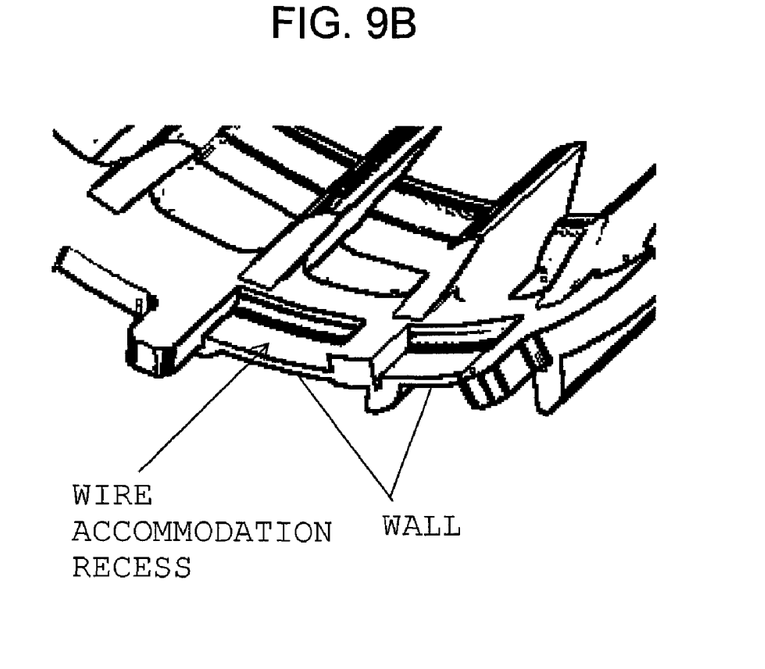
FIG. 9B is an enlarged view of a portion of FIG. 9A within a broken-line circle.

FIG. 9A is a perspective view showing a third example cooling fan configured in accordance with the present invention, and FIG. 9B is an enlarged view of a portion of FIG. 9A within a broken-line circle. The cooling fan shown in FIGS. 9A and 9B has the same structure as the cooling fan shown in FIGS. 8A and 8B, except that a thin wall is provided on the radially outer side of each wire accommodation recess (at the radially outermost portion of the second fan ring). In some cases, after the cooling fan is bonded and fixed, a fixing agent is applied to the windings in order to prevent the winding from becoming loose. When the wire accommodation recesses of the above-described first and second example cooling fans are employed, the fixing agent may leak to the outer circumferential surface of the rotor through the wire accommodation recesses. The provision of the thin wall as shown in FIGS. 9A and 9B prevents the fixing agent from leaking to the outer circumferential surface, and prevents interference between the cooling fan and the windings.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A cooling fan which is attached to a rotor which includes a shaft, a rotor core attached to the shaft and including a plurality of windings provided thereon, and a commutator attached to the shaft, the cooling fan comprising:
    a fan ring having a first end surface to be fixed to the rotor core and a second end surface on an opposite side of said first end surface; and
    a plurality of fins connected to said second end surface of the fan ring, said fan ring having wire accommodation recesses on said first end surface, said wire accommodation recesses communicating with core slots of the rotor core, wherein the wire accommodation recesses are formed such that at least portions of the wire accommodation recesses face the corresponding core slots so as to receive corresponding portions of wires wound to form the windings, the portions being expanded to the outer circumferential edge of the core rotor, wherein the depth of the wire accommodation recesses as measured along a thrust direction is equal to or greater than the diameter of each of the wound wires, said fan ring having positioning leg portions provided on said first end surface thereof facing the thrust direction, said fan ring being positioned in relation to the rotor core through insertion of the positioning leg portions into the core slots of the rotor core, said wire accommodation recesses being formed on said first end surface of the fan ring facing the thrust direction.

2. A cooling fan which is attached to a rotor which includes a shaft, a rotor core attached to the shaft and including a plurality of windings provided thereon, and a commutator attached to the shaft, the cooling fan comprising:
    a fan ring to be fixed to the rotor core; and
    a plurality of fins connected to the fan ring, wherein the fan ring has wire accommodation recesses which communicate with core slots of the rotor core, wherein the wire accommodation recesses are formed such that at least portions of the wire accommodation recesses face the corresponding core slots so as to receive corresponding portions of wires wound to form the windings, the portions being expanded to the outer circumferential edge of the core rotor, wherein the depth of the wire accommodation recesses as measured along a thrust direction is equal to or greater than the diameter of each of the wound wires, said fan ring having positioning leg portions provided on an end surface thereof facing the thrust direction, said fan ring being positioned in relation to the rotor core through insertion of the positioning leg portions into the core slots of the rotor core, said wire accommodation recesses being formed on the end surface of the fan ring facing the thrust direction, said wire accommodation recesses being formed adjacent to the positioning leg portions, wherein pocket forming projections are provided on the end surface of the fan ring facing the thrust direction to thereby form adhesive pockets.

3. A cooling fan which is attached to a rotor which includes a shaft, a rotor core attached to the shaft and including a plurality of windings provided thereon, and a commutator attached to the shaft, the cooling fan comprising:
    a fan ring to be fixed to the rotor core; and
    a plurality of fins connected to the fan ring, wherein the fan ring has wire accommodation recesses which communicate with core slots of the rotor core, wherein the wire accommodation recesses are formed such that at least portions of the wire accommodation recesses face the corresponding core slots so as to receive corresponding portions of wires wound to form the windings, the portions being expanded to the outer circumferential edge of the core rotor, wherein the depth of the wire accommodation recesses as measured along a thrust direction is equal to or greater than the diameter of each of the wound wires, said fan ring having positioning leg portions provided on an end surface thereof facing the thrust direction, said fan ring being positioned in relation to the rotor core through insertion of the positioning leg portions into the core slots of the rotor core, said wire accommodation recesses being formed on the end surface of the fan ring facing the thrust direction, said wire accommodation recesses being formed adjacent to the positioning leg portions, wherein pocket forming projections are provided on the end surface of the fan ring facing the thrust direction to thereby form adhesive pockets, wherein the circumferential positions of the wire accommodation recesses coincide with respective radially outermost portions of the plurality of windings.

4. A cooling fan which is attached to a rotor which includes a shaft, a rotor core attached to the shaft and including a plurality of windings provided thereon, and a commutator attached to the shaft, the cooling fan comprising:
    a fan ring to be fixed to the rotor core; and
    a plurality of fins connected to the fan ring, wherein the fan ring has wire accommodation recesses which communicate with core slots of the rotor core, wherein the wire accommodation recesses are formed such that at least portions of the wire accommodation recesses face the corresponding core slots so as to receive corresponding portions of wires wound to form the windings, the portions being expanded to the outer circumferential edge of the core rotor, wherein the depth of the wire accommodation recesses as measured along a thrust direction is equal to or greater than the diameter of each of the wound wires, said fan ring having positioning leg portions provided on an end surface thereof facing the thrust direction, said fan ring being positioned in relation to the rotor core through insertion of the positioning leg portions into the core slots of the rotor core, said wire accommodation recesses being formed on the end surface of the fan ring facing the thrust direction, said wire accommodation recesses being formed adjacent to the positioning leg portions, wherein pocket forming projections are provided on the end surface of the fan ring facing the thrust direction to thereby form adhesive pockets, wherein the circumferential positions of the wire accommodation recesses coincide with respective radially outermost portions of the plurality of windings, said plurality of fins being formed integrally with the fan ring and another fan ring separated from the former fan ring in the thrust direction such that the plurality of fins are disposed between and connected to the two fan rings.

* * * * *